US008402627B2

(12) United States Patent
Betcher et al.

(10) Patent No.: US 8,402,627 B2
(45) Date of Patent: Mar. 26, 2013

(54) PULLER TOOL

(75) Inventors: Larry Betcher, Northfield, MN (US); Jacob Hanson, Owatonna, MN (US); Jose Barrios, Owatonna, MN (US); Robert Jensen, Clarks Grove, MN (US)

(73) Assignee: Service Solutions U.S. LLC, Warren, MI (US)

( * ) Notice: Subject to any disclaimer, the term of this patent is extended or adjusted under 35 U.S.C. 154(b) by 283 days.

(21) Appl. No.: 12/794,373

(22) Filed: Jun. 4, 2010

(65) Prior Publication Data

US 2011/0131783 A1 Jun. 9, 2011

Related U.S. Application Data

(63) Continuation-in-part of application No. 12/633,241, filed on Dec. 8, 2009.

(51) Int. Cl.
*B23P 19/04* (2006.01)

(52) U.S. Cl. ........................................ 29/426.1; 254/100

(58) Field of Classification Search ................. 29/426.1; 254/100

See application file for complete search history.

(56) References Cited

U.S. PATENT DOCUMENTS

| | | | | |
|---|---|---|---|---|
| 1,402,477 | A * | 1/1922 | Carradus et al. | 29/261 |
| 1,620,211 | A * | 3/1927 | Jerabek | 29/261 |
| 3,103,740 | A * | 9/1963 | Crenshaw | 29/261 |
| 3,402,455 | A * | 9/1968 | Converse | 29/261 |
| 4,042,139 | A * | 8/1977 | Pernsteiner et al. | 414/427 |
| 4,761,869 | A * | 8/1988 | Barry et al. | 29/261 |
| 4,908,925 | A * | 3/1990 | Johnson | 29/260 |
| 5,005,449 | A * | 4/1991 | Sorensen et al. | 81/152 |
| 5,408,732 | A * | 4/1995 | Anfuso | 29/263 |
| 5,826,310 | A * | 10/1998 | Hobday | 24/514 |
| 6,012,211 | A * | 1/2000 | Ochoa et al. | 29/426.5 |
| 6,106,216 | A * | 8/2000 | Hogan | 414/678 |
| 6,450,489 | B1 * | 9/2002 | Wang | 269/6 |
| 6,609,283 | B1 * | 8/2003 | Somerville | 29/262 |
| 6,925,696 | B1 * | 8/2005 | Williams | 29/252 |
| 7,685,688 | B2 * | 3/2010 | Fan | 29/259 |
| 7,770,277 | B2 * | 8/2010 | Wridt | 29/261 |
| 7,909,314 | B2 * | 3/2011 | Roesch et al. | 269/6 |
| 2003/0037425 | A1 * | 2/2003 | Sawaya | 29/426.5 |
| 2005/0177983 | A1 * | 8/2005 | Holms | 16/435 |
| 2005/0177988 | A1 | 8/2005 | Williams | |
| 2011/0179616 | A1 * | 7/2011 | Oachs et al. | 29/259 |

OTHER PUBLICATIONS

Matco Tools Catalog—Brake Drum & Rotor Puller (2 sheets); and 3 sheets of photos of the tool.

* cited by examiner

*Primary Examiner* — Derris Banks
*Assistant Examiner* — Anthony Green
(74) *Attorney, Agent, or Firm* — Baker Hostetler LLP

(57) ABSTRACT

A puller tool and method for pulling a component from another component are provided. The puller tool can include a cross bar, a pair of puller legs that are movable along the length of the cross bar and a forcing screw. The puller legs can be quickly positioned anywhere along the length of the cross bar through a quick release mechanism. The cross bar can include notches on its outer surface to ensure that the puller legs are equidistant from each other during use.

18 Claims, 5 Drawing Sheets

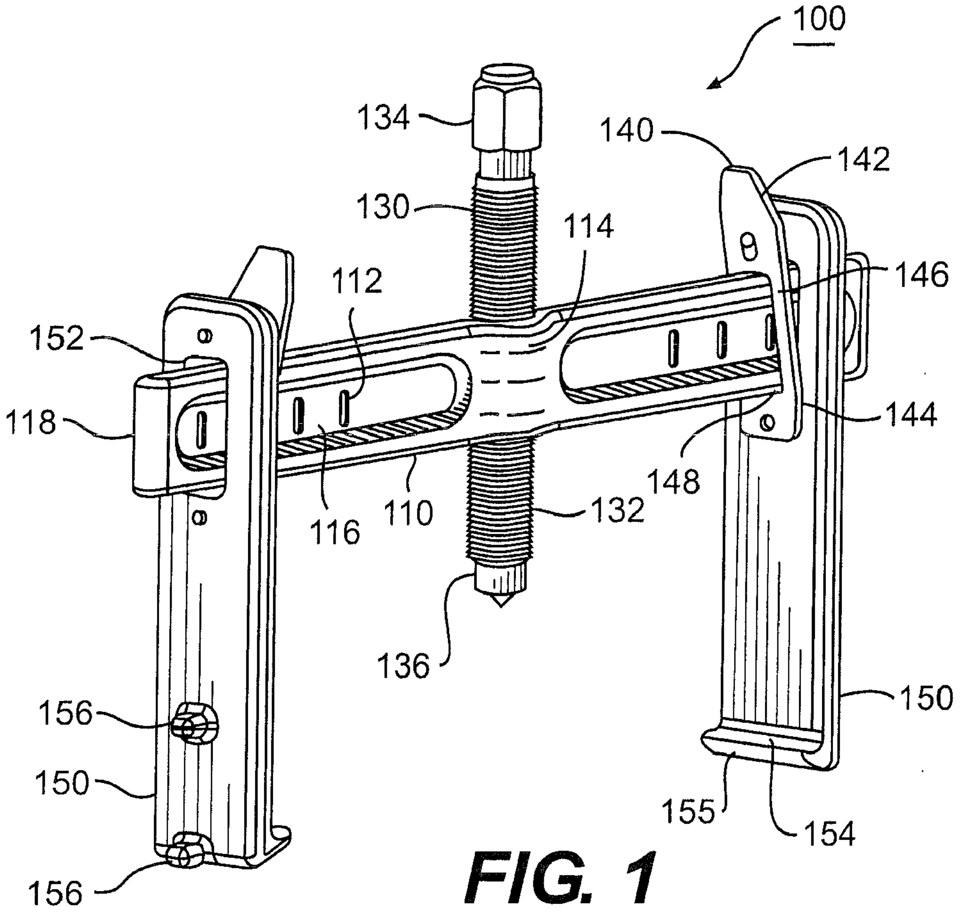
FIG. 1
FIG. 2
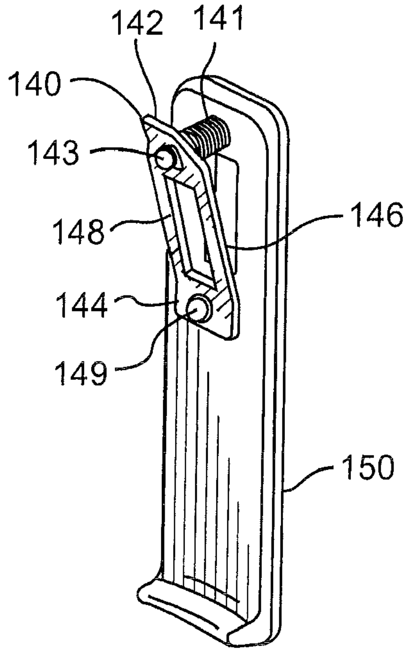

PULLER TOOL

CROSS-REFERENCE TO RELATED APPLICATIONS

This application claims priority to, and is, a continuation-in-part of U.S. patent application entitled, Puller Tool, filed Dec. 8, 2009, having Ser. No. 12/633,241, the disclosure of which is hereby incorporated by reference in its entirety.

FIELD OF THE INVENTION

The present invention relates generally to a puller. More particularly, the present invention relates to a puller tool for servicing a component such as a vehicle component.

BACKGROUND OF THE INVENTION

Automotive vehicles include components that will need to be replaced or serviced after a period of time. Such components include brake drums/rotors. Often the components can be difficult to remove because they rust or become corroded. The mechanic either breaks the drum off with a hammer or uses a universal puller that can not adapt well to the component being serviced. Thus, current servicing techniques can lead to vehicle damage, significant time loss, or other undesirable condition.

Accordingly, it is desirable to provide a tool that can easily remove the component being serviced by the user.

SUMMARY OF THE INVENTION

The foregoing needs are met, to a great extent, by the present invention, wherein in one aspect an apparatus is provided that in some embodiments include a puller that includes a quick adjustment mechanism to quickly adjust the puller jaws to the component being serviced.

In accordance with one embodiment of the present invention a puller is provided that can include a cross bar having a plurality of alignment notches on an outside surface, a pair of puller legs that receives the cross bar and includes a foot at a lower end to engage a component being serviced, a forcing screw received in a middle portion of the cross bar, the forcing screw having a rotational end and an engagement end, and a quick release mechanism coupled to the puller legs to position the puller legs along a length of the cross bar.

In accordance with another embodiment of the present invention, a puller tool is provided for servicing a component which can include a means for supporting having a plurality of alignment marks on an outside surface, a means for engaging that receives the means for supporting and includes a foot at a lower end to engage a component being serviced, a means for screwing received in a middle portion of the means for supporting, means for screwing having a rotational end and an engagement end, and a means for releasing coupled to the means for engaging to position the means for engaging along a length of the means for supporting.

In accordance with yet another embodiment of the present invention, a method of removing a component with a puller tool is provided and can include positioning a pair of puller legs along a cross bar of the puller tool with a quick release mechanism so that the puller legs are coupled to the component being serviced, turning a forcing screw in a first direction with a rotational tool until it contacts the component being serviced, and turning the forcing screw in the first direction to move the component being serviced.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 illustrates a plan view of the automotive puller according to an embodiment of the invention.

FIG. 2 illustrates the quick release mechanism of FIG. 1 on the puller leg.

DETAILED DESCRIPTION

Figure 3:
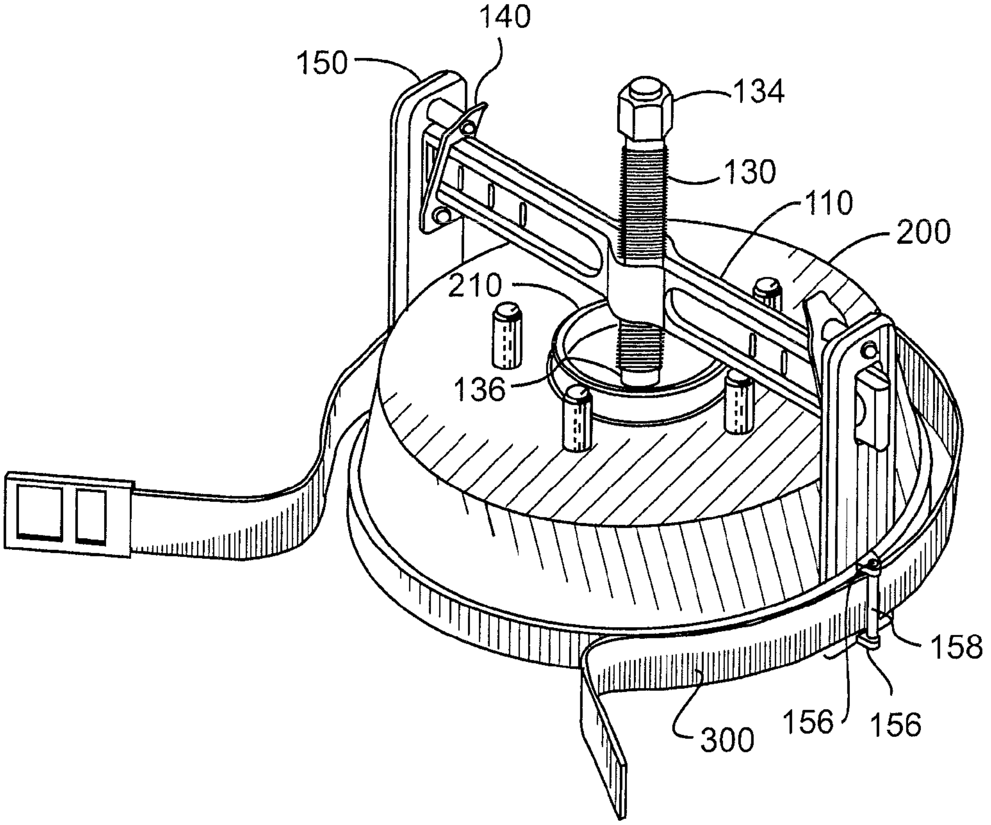
FIG. 3 illustrates the puller in use with a brake drum according to an embodiment of the invention.

The invention will now be described with reference to the drawing figures, in which like reference numerals refer to like parts throughout. An embodiment in accordance with the present invention provides a puller and method to components, such as vehicle components. The puller has a quick release mechanism to quickly position puller legs around the component being serviced. In one embodiment, the vehicle components can include sleeves, brake drum, pullers and other components.

FIG. 1 illustrates a plan view of the automotive puller 100 according to an embodiment of the invention. The puller 100 includes a cross bar 110, a forcing screw 130, and puller legs 150. The cross bar 110 is generally rectangular in shape, but can be other shapes such as oval or square. The ends 118 of the cross bar 110 can be rounded for aesthetic and safety reasons. The cross bar 110 can include marking notches 112 that can used to align a quick release mechanism 140 that is attached to the puller legs 150 (discussed below). The marking notches 112 are evenly spaced from a center portion 114 of the puller 100. Alternatively, the marking notches 112 can be evenly spaced from ends 118 of the puller 100. The user can align the puller legs 150 with the notches 112 so that the puller legs 150 can be evenly spaced from each other in a quick fashion and no offset occurs. In one embodiment, the marking notches can be positioned within a grooved portion 116 of the cross bar 110. In another embodiment, the marking notches 112 can be on the outer surface of the cross bar along its length.

In another embodiment, the top portion of the cross bar can include indentions or serrations. The notches can be used to position the puller legs along the cross bar. Similar to the marking notches 112, the indentions can be used to equally space (equidistant) the puller legs 150 during use.

In further embodiments, there can more than one cross bar, such as two, three, four or more cross bar 110. The cross bars can be placed in parallel to each other, x-shaped, in a cross configuration or another configurations desired by the user.

The forcing screw 130 can be positioned within the center portion 114 of the puller 100. The forcing screw 130 includes threads 132 on its outer surface. The threads 132 can mate with the threads (not shown) in the center portion 114. The forcing screw 130 may have one diameter or it may have several diameters of various sizes as shown in FIG. 1. The forcing screw 130 has a rotational end 134 which can mate with a rotational tool (not shown). The rotational tool can be a wrench, a plier, a powered tool or other types of tool that creates rotational movement of the forcing screw 130 in a desired direction. The rotational end 134 can be of various shapes in order to mate with the rotational tool, such as triangular, square, pentagon, hex, octagon and other shapes. The rotational tool can be used to rotate the forcing screw 130 in one direction to advance it or in a second direction to retreat it.

In another embodiment, the screw can be a hydraulic ram that includes a piston that can extended and retracted. In this embodiment, a rotational tool is not needed as hydraulics can be used to extend and retract the piston. The screw can be any type of device that can extend or retreat from the middle portion of the cross bar.

The forcing screw 130 includes an engagement end 136 to engage the vehicle component being worked on. The engagement end 136 can be flat or can include a tapered pointed end (as shown). The engagement end 136 can also be used to provide leverage to the puller 100 when in use. Thus, when the forcing screw is rotated, it will apply pressure to another component (wheel hub, for example) that is coupled to the component being pulled.

The puller legs 150 can be located anywhere along the cross bar 110. The puller legs include an opening 152 that can be sized and shaped to receive the cross bar 110. This allows the puller legs 150 to be positioned along the cross bar 110. The puller legs 150 can include a hooked feet 154 that is generally 90 degrees to an axis of the puller legs. However, the hooked feet 154 can be manufactured to have any angle desired so that it can be mated with the component being serviced. The hooked feet 154 are designed to mate with the component that needs to be pulled, for example, so that when the forcing screw 130 is rotated, the component can be moved as desired with the assistant of the hooked feet 154. The hooked feet 154 can also include a radius or curved end 155. The curved end 155 can be manufactured to have any curved angle desired.

The puller legs 150 can be any shape or size (length or width) as desired by the user and can be reversible to the position showed in FIG. 1. Thus, the hooked feet 154 may be positioned facing each other, away from each other or one towards and one away as desired by the user. Alternatively, the hooked feet may be placed on one side or both sides of the puller legs and along any length of the puller legs. In other embodiments, the hooked feet 154 can be jaws or teeth or other similar means. The puller legs 150 may also have screws, nails or similar attachments that can be attached to it or can include places that screws, nails or similar attachments can be attached or receive thereto. Alternatively, there can be three, four, five, six or more puller legs positioned on the cross bar. The number will be dependent on the needs of the user.

Retaining tabs 156 can be positioned a long an outside surface of the puller legs to receive various restraining means. A strap (FIG. 3) can be placed around the puller legs 150 to provide additional support to the puller legs and provide additional safety features. In other embodiments, the strap can be Velcro, metal band, leather band or other similar material. The retaining tabs 156 provide support and keep the straps in place during use. The retaining tabs 156 can protrude from the surface of the puller legs at any length desired. The retaining tabs may protrude at 90 degrees or angled at any angle desired by the user. Being angled will help keep the restraining means in place during use.

A quick release mechanism 140 (further discussed below) is also attached to a surface of the puller legs 150. In the embodiment shown in FIG. 1, the quick release mechanism 140 is on an inside surface of the puller legs 150, however, they can be placed on the outside or inside surface or both.

FIG. 2 illustrates the quick release mechanism 140 of FIG. 1 on the puller leg 150. The quick release mechanism 140 is coupled to the puller legs 150 at two points. The first point is at first pin 143, which extends from the puller legs 150. The first pin 143 also includes a spring 141 that surrounds the first pin 143. The spring 141 is designed to bias the quick release mechanism 140 in an “engaged” position with the cross bar 110. In an alternative embodiment, the spring mechanism can be simply attached at one end to the puller legs and another end to the thumb tab portion. Other similar biasing device to a spring may also be used such as elastomeric devices, actuators, and the like.

The first pin’s head is larger than the pin’s body and thus can be used to retain a thumb tab 142 that is angled relative to a main portion 146. The angle of the thumb tab 142 makes it easier for the user to use their thumb to work the quick release mechanism 140. However, in another embodiment, the thumb tab 142 can be straight relative to the main portion 146. Further, the width of the thumb tab 142 is smaller than the width of the main portion 146. In other embodiments, the thumb tab 142 can be the same size or different size (larger, for example) than the main portion 146 or a lower portion 144.

The main portion 146 further includes a tab opening 148 that receives the cross bar 110 (FIG. 1). The tab opening 148 can be any size or shape to accommodate the cross bar 110. It is the top portion of the tab opening 148 that engages the cross bar 110 to quickly position the puller legs 150 along the cross bar 110 and to keep the puller legs 150 from further movement once the position is set. In an alternative embodiment, the bottom portion of the tab opening 148 engages the cross bar 110. In still another embodiment, the bottom portion and the top portion engages the cross bar 110. The lower portion 144 is coupled to the puller legs 150 at a second point or at a second pin 149. The lower portion 144 is also angled relative to the main portion 146 and can be designed to be flush with the puller legs. In another embodiment, the lower portion can have the same angle or different angle from the main portion 146 and thumb tab portion 142 as desired by the user.

In operation, the quick release mechanism 140 is easy to use to position the puller legs 150 anywhere along the cross bar 110. A user can use his thumb or any other finger to push in the thumb tab 142 towards the puller legs 150, thus releasing the top portion of the tab opening 148 away from the cross bar 110. Once the desired position on the cross bar 110 is reached at a particular notch 112, for example, then the user can release the thumb tab and the top portion of the tab opening can reengage the top portion of the cross bar with the assistance of the spring 141. Once positioned, the puller legs 150 will stay in place until the quick release mechanism 140 is utilized again.

The main components of the puller tool 100 can be made of various materials including forged metals, steel, aluminum, and other similar material. The materials used should be strong enough to withstand various forces that are exerted on the puller tool 100 during use.

FIG. 3 illustrates the puller 100 in use with a brake drum 200 according to an embodiment of the invention. The puller 100 is engaged with the vehicle component that is being serviced, such as the brake drum 200. The brake drum 200 is installed on a wheel hub 210 and needs to be removed in order to be serviced. However, the brake drum 200 may be stuck on the wheel hub 210 due to grime, and other contaminants and needs the puller 100 in order to be removed from the wheel hub 210.

In this view, the puller 100 and its components are coupled to the brake drum 200. The forcing screw's 130 engagement end 136 is engaged with the wheel hub 210 by rotating the forcing screw 130 in a first direction with the rotational tool (not shown and previously described). With the engagement end 136 engaged with the wheel hub 210, the puller 100 has leverage to pull on the brake drum 200 when the forcing screw 130 is rotated in a desired direction. Also shown are the pulling legs 150 with the hooked feet 154 being engaged with brake drum 200 after being positioned by the quick release mechanism 140.

Also shown is a strap 300 received around a bottom portion of the puller legs. In one embodiment, the strap 300 may be secured to the puller legs with a holder 158 that is received by the retaining tab 156. The strap 300 can help to ensure that the puller legs 150 are properly attached to the brake drum 200. However, the strap 300 is not required to be used with the puller tool 100.

By rotating the forcing screw 130 again in the first direction, the cross bar will move towards the rotational end 134 of the forcing screw and thus moving the puller legs 150 and the brake drum with it. This will allow the brake drum 200 to be removed from the wheel hub 210 and serviced. In order to remove the puller 100, the forcing screw 130 can be moved in the second direction.

FIGS. 4-7 illustrate another embodiment in accordance with the invention. Among other things, the quick release mechanism 406 shown in FIGS. 4-7 differs slightly from the quick release mechanism 140 discussed in FIGS. 1-3. Other features of the puller tool 400 are very similar and will not be described again in detail as they have already been described in the embodiments shown in FIGS. 1-3.

Figure 4:
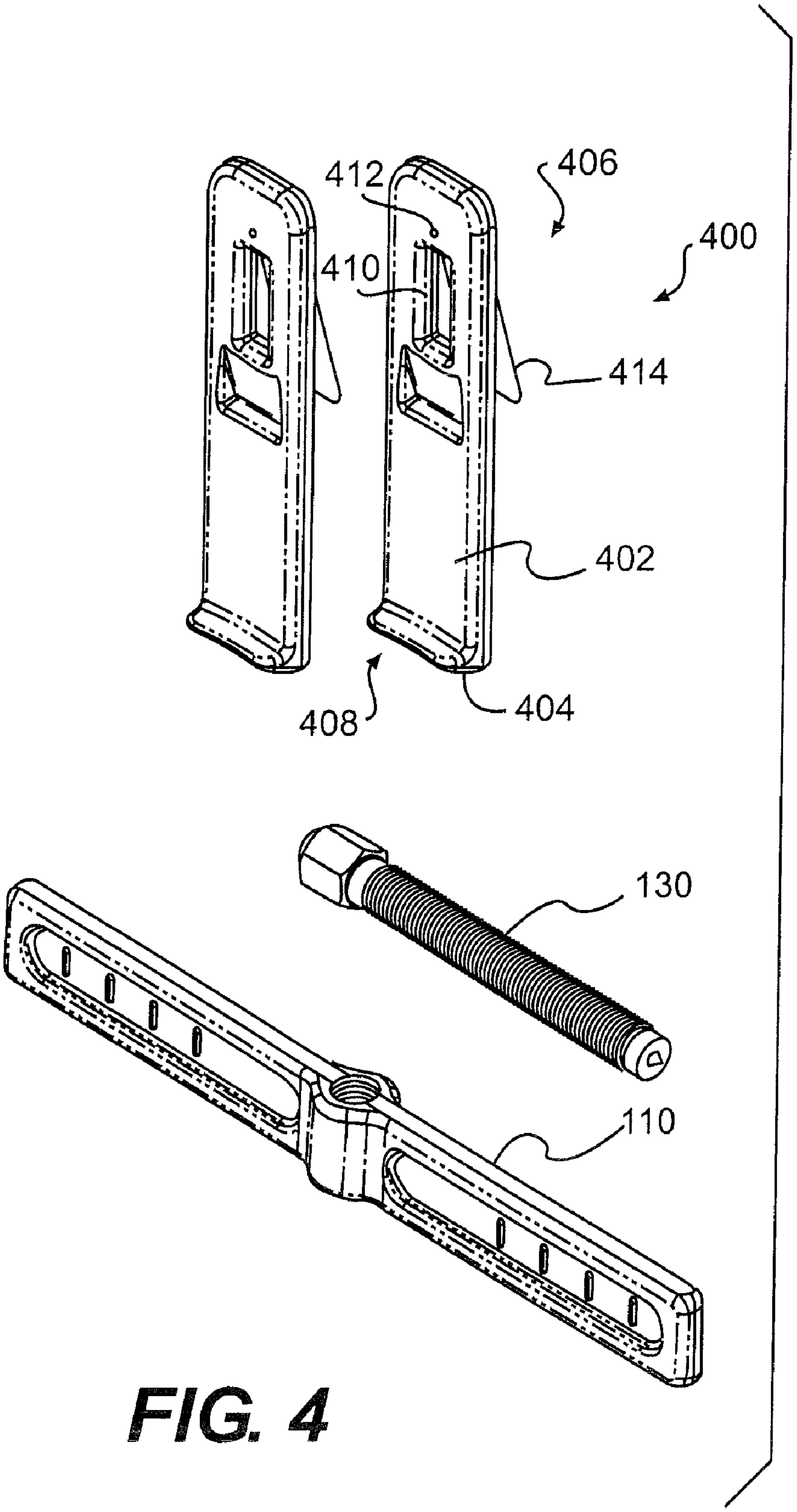
FIG. 4 is a perspective view of a disassembled puller tool in accordance with another embodiment of the invention.
Figure 6:
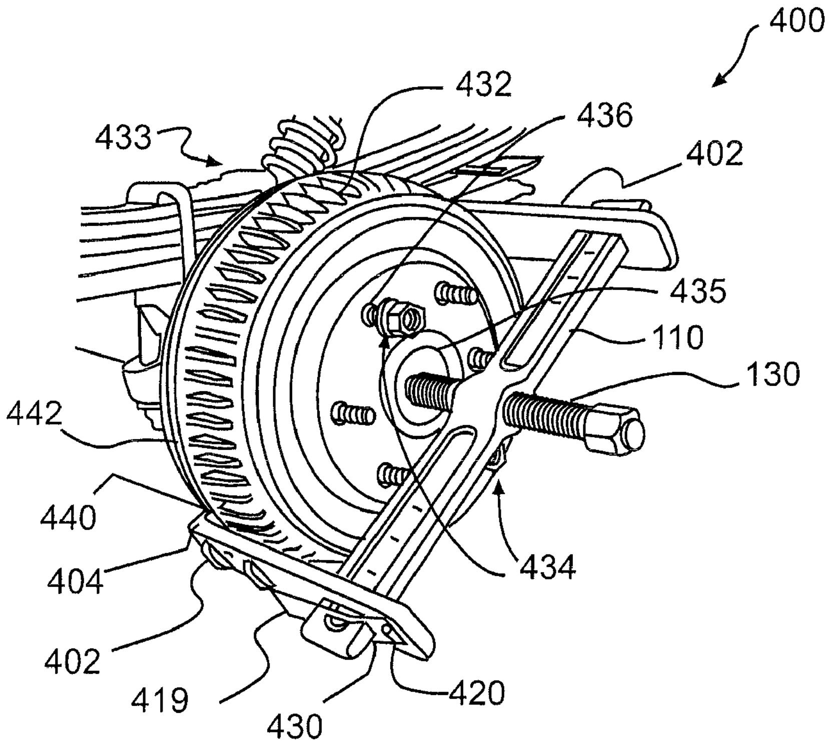
FIG. 6 is a perspective view of a puller tool attached to a work piece.
Figure 7:
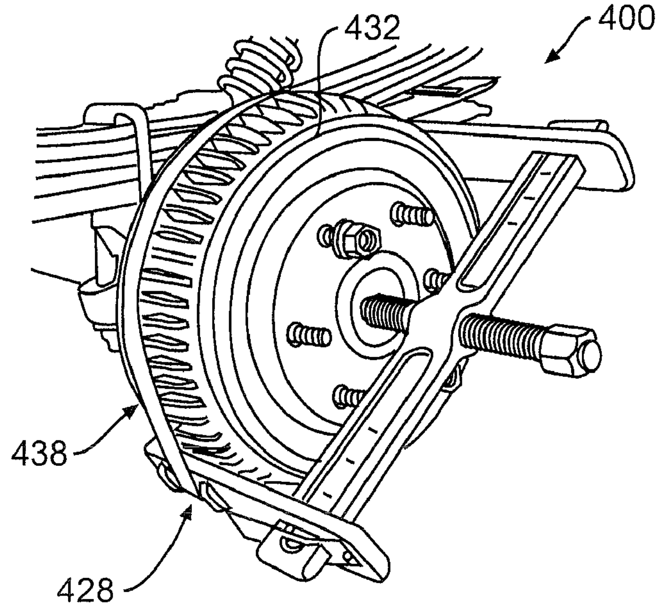
FIG. 7 is a perspective view of a puller tool attached to a brake drum having a strap mounted to both the puller tool and the brake drum.

FIG. 4 illustrates a puller tool 400 in accordance with another embodiment of the invention. The puller tool 400 is shown in FIG. 4 in a partially disassembled state. The puller tool 400 includes two puller legs 402. For the sake of clarity, only one puller leg 402 shown in FIG. 4 has reference numerals. Both pull-legs 402 are the same. The puller legs 402 include hook feet 404. The puller legs 402 are equipped with a quick release mechanism 406 which will be described in more detail later below. The puller legs 402 includes a curved radius 408 associated with the hook feet 404. The curved radius 408 may be useful in engaging round objects such as brake drums (as shown in FIGS. 6 and 7). The puller legs 402 include an opening 410. The opening 410 is dimensioned to be slightly larger than cross-sectional area of the cross bar 110.

The cross bar 110 is inserted in to the openings 410 in the puller legs 402 as shown and described in the embodiment shown in FIGS. 1-3. The forcing screw 130 is inserted into the cross bar 110 as described above. The puller legs 402 engages the cross bar 110 in a manner similar to that described above.

Figure 5:
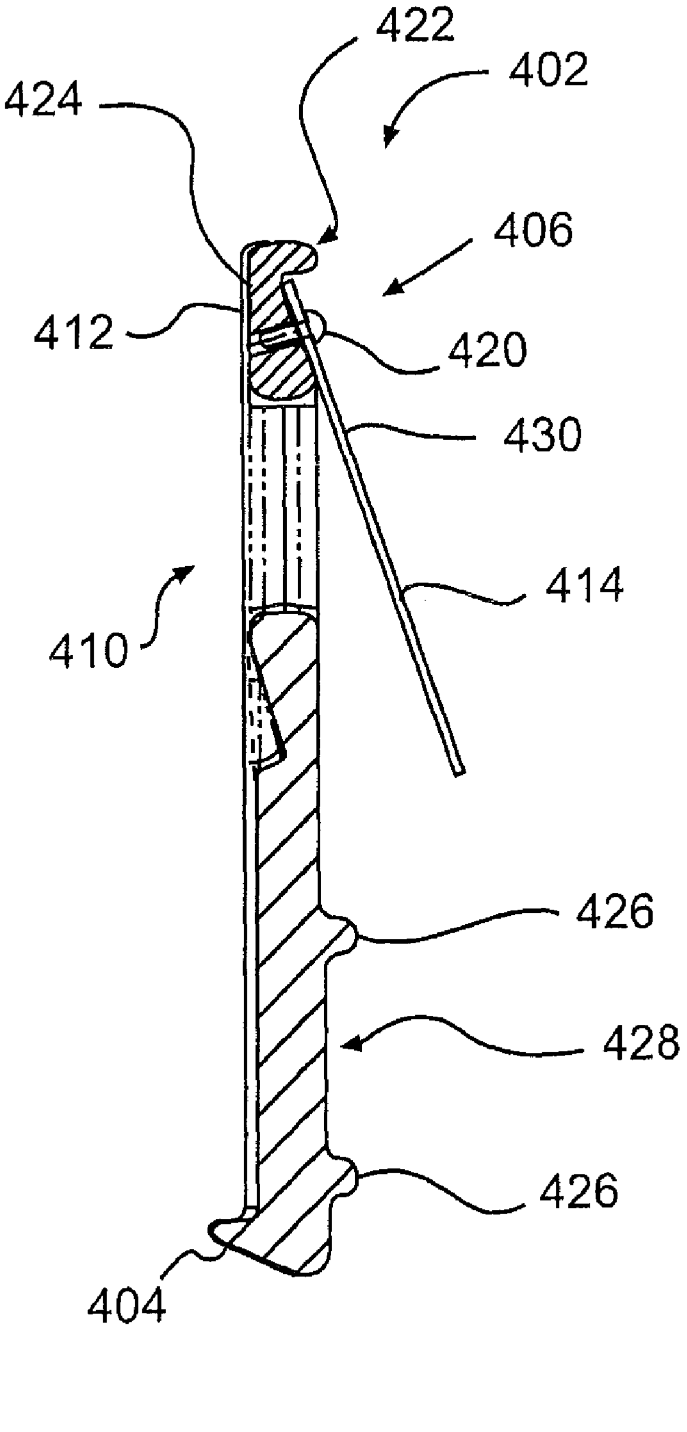
FIG. 5 is a cross-section view of a puller leg in accordance with the embodiment shown in FIG. 4.

The quick release mechanism 406 includes a tab 414. The tab 414 maybe made of spring steel. As shown in FIG. 5 the tab 414 is attached to the puller leg 402 in a recess 422 in the puller legs 402. The recess 422 defines at least in part an inclined surface 424. The inclined surface 424 in some embodiments of the invention may be at an angle of about 14 degrees with respect to an outer surface of the puller legs 402 as shown in FIG. 5. The inclined surface 424 provides a seating surface for the tab 414. The tab 414 is attached to the puller legs 402 by a fastener 420 that may be screwed into a tapped hole 412.

The puller legs 402 may also be equipped with retaining ridges 426. The retaining ridges 426 define a strap retaining area 428 in between the retaining ridges 426. When the puller legs 402 are mounted to a brake drum 432 (as shown in FIG. 7 a strap, 438 is retained in the strap retaining area 428.) The strap 438 (as shown in FIG. 7) assists the hooked feet 404 from disengaging prematurely from the brake drum 432.

The tab 414 also has an opening 430 that is roughly aligned with the opening 410 with the puller legs 402. A user can press the tab 414 toward the puller leg 402 and insert the cross bar 110 through the openings 410, 430 in the puller leg 402 and tab 414. When the user has placed the cross bar 130 and puller legs 402 in a desired position with respect to each other, the user may then release the tab 414 which may be made of a resilient material. According to some embodiments of the invention the resilient material may be spring steel. The tab 414 is biased toward the position as shown in FIG. 5. As the tab 414 moves toward the position as shown in FIG. 5, the tab 414 will engage the cross bar 110 in an interference type fit.

One of ordinary skill in the art will appreciate after reviewing this disclosure that the opening 430 in the tab 414 may be dimensioned to be slightly larger than the cross-sectional area of the cross bar 110 to allow the cross bar 110 to move freely through the opening 430 in the tab 414 when the tab is deflected to a position toward the puller legs 402. However, as the tab 414 moves away from the puller legs 402 toward the position as shown in FIG. 5, the tab 414 will engage the cross bar 110 in a friction fit type which will thereby secure the puller leg 402 to the cross bar 110.

FIGS. 6 and 7 illustrate use of the puller tool 400 in accordance with some embodiments of the invention. The puller tool 400 is shown with the puller legs 402 engaging a brake drum 432. The brake drum 432 is connected to a vehicle 433. The forcing screw 130 is positioned nearly centered on the wheel hub 435. The cross bar 110 is engaged with the puller legs 402 and extends through the opening 430 in the tab 414. The tab 414 is secured by the fastener 420 to the puller leg 402.

Lug nuts 434 have been removed from most of the studs 436. However, some lug nuts 432 remain so that the brake drum 432 is not inadvertently completely pulled off of the vehicle 433 and falls to the ground. Actuation of the forcing screw 430 with a tool will cause the forcing screw 430 to urge against the hub 435 and at the same time cause the puller legs 402 to exert a pulling force on the brake drum 432.

FIG. 7 illustrates a strap 438 engaging both the brake drum 432 and the puller tool 400. The strap 438 engages the puller tool 400 at the strap area 428.

Some embodiments in accordance to the invention include operation of the puller tool 400. Operation of the puller tool 400 can occur as follows: an operator refers to a vehicle service manual for instructions on using an appropriate lifting device to hoist the vehicle 433 off the ground. The user should lift the vehicle 433 just far enough off the ground to remove the wheel and tire.

After removing the wheel the user should replace thread two lug nuts 439 back onto opposing studs 436. The lug nuts 439 should be backed off three or four turns to allow the brake drum 432 to be pulled away, but not fall off the vehicle 433. A user may estimate the diameter of the brake drum 432 using marks on the cross bar 448 as a guide (the marks are described above). The user may set the puller legs 402 an equal distance apart from the approximate center on each side of the brake drum 432.

With the forcing screw 130 at the center of the wheel hub 435, a user may position the puller legs 402 into a groove 440 between the brake drum 432 and a backing plate 442 as shown in FIG. 6. A user may adjust the puller legs 402 on the cross bar 110 as needed. A user should then verify that the hooked feet 404 on the puller legs 402 have good contact with the brake drum 432 and hand tighten the forcing screw 130 to engage the wheel hub 435. A user should then place a strap 438 over the puller tool 400 and brake drum 432 as shown in FIG. 7. The strap 438 should be positioned around the outer edge of the brake drum 432 and in the strap area 428 of the puller tool 400 as shown in FIG. 7. Using a ratchet, impact wrench, or any other suitable tool, a user may then turn the forcing screw 130 inward just enough to remove the brake drum 432. A user may then remove the strap 438 and the puller tool 400 from the brake drum 432. A user may then remove the lug nuts 439 and completely remove the brake drum 432 from the vehicle 433.

Although the components described herein are vehicle components, the puller tool can be used to move any component that is coupled to another component. For example, an impeller from a shaft. The puller tool provides a quick and secure way to attach itself to the component being serviced and provides a mechanic an alternative to using a hammer to remove the component being serviced from another component.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A puller tool comprising:

a pair of puller legs;

an engaging portion located at one end of each puller leg;

an opening located at each end in each puller leg;

a cross bar configured to fit in the opening;

a forcing screw configured to engage with the crossbar; and an attaching mechanism located on each puller leg configured to secure each puller leg with the crossbar wherein the attaching mechanism includes a resilient tab connected with the puller leg at an acute angle, wherein the puller legs have retaining ridges on a side opposite of a side having the engaging surface and the retaining ridges defining a strap retaining area between the retaining ridges.

2. The puller tool of claim 1, wherein the resilient tab is spring steel.

3. The puller tool of claim 1, wherein the attaching mechanism only has one moving part.

4. The puller tool of claim 1, wherein the puller legs each include a recess defined at least in part by a flat angled surface.

5. The puller tool of claim 4, wherein the resilient tab lies, at least in part, against the flat angled surface.

6. The puller tool of claim 5, wherein the resilient tab is secured to the puller leg by a fastener.

7. The puller tool of claim 1, wherein the opening is dimensioned to be larger than the cross-sectional area of the cross bar.

8. The puller tool of claim 7, wherein tab has an opening that is dimensioned larger than the cross-sectional area of the cross bar.

9. The puller tool of claim 8, wherein the tab is biased to engage the cross bar via the opening in the tab in a friction fit.

10. The puller tool of claim 9, wherein the tab is configured to flex in a direction toward the puller leg to which the tab is mounted and dimensioned so that the friction fit with the crossbar is relieved as the tab moves toward the puller leg to which the tab is mounted.

11. The puller tool of claim 1, wherein the engaging portion is hook shaped and is curved so as to correspond to a round object when engaged with the round object.

12. The puller tool of claim 1, wherein the acute angle is about 14°.

13. A puller tool comprising:

means for pulling;

means for engaging located at one end of the means for pulling;

an opening located at each end in the means for pulling;

means for cross connecting configured to fit in the opening;

means for pulling configured to engage with the cross connecting means; and means for attaching located on the means for pulling configured to secure the means for pulling with the cross connecting means wherein the means for attaching includes a means for flexing connected with the means for pulling at an acute angle, wherein the means for pulling has retaining ridges on a side opposite of a side having the engaging surface and the retaining ridges define a strap retaining area between the retaining ridges.

14. A method of removing a brake drum comprising:

placing a forcing screw near the center of a wheel hub;

positioning an engaging surface of a puller tool in a groove between a brake drum and a backing plate;

tightening the forcing screw to the wheel hub, placing a strap over a puller and brake drum; and tightening the strap.

15. The method of claim 14, further comprising:

maintaining at least one lug nut on a stud associated with a wheel that is having the brake drum removed.

16. The method of claim 14, further comprising:

flexing a tab on a puller leg and sliding the puller leg along a cross bar.

17. The method of claim 16, further comprising:

locking a puller leg to the cross bar by releasing the tab and allowing the tab to move to a biased position.

18. The method of claim 14, wherein the forcing screw is tightened with a tool.

* * * * *